Oct. 15, 1935.  F. W. LORIG  2,017,404
CONVEYER TROLLEY
Filed Dec. 8, 1933
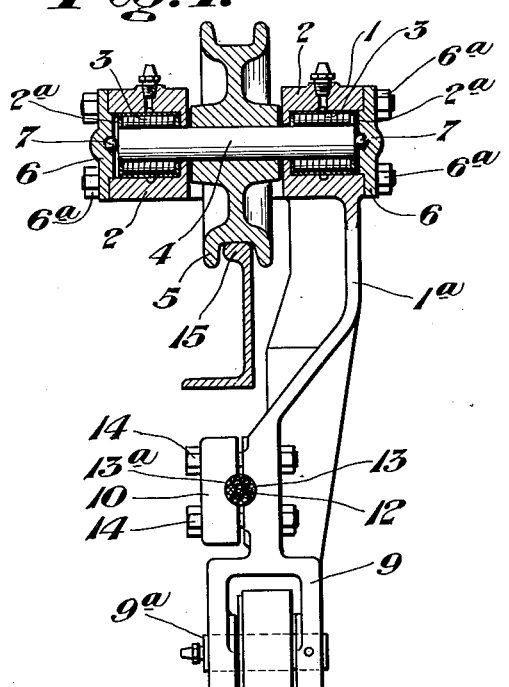
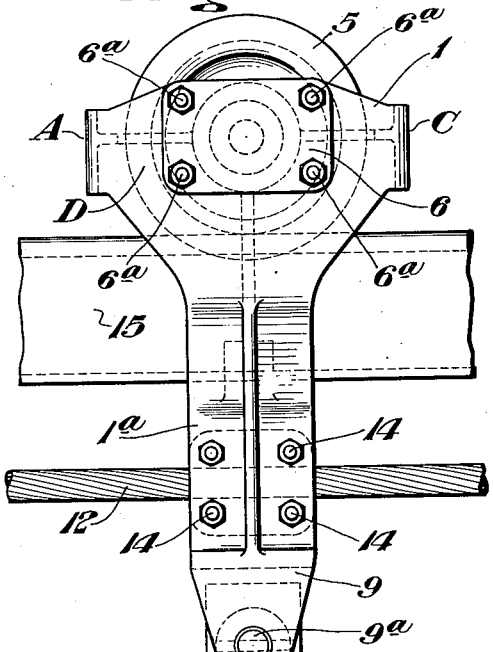
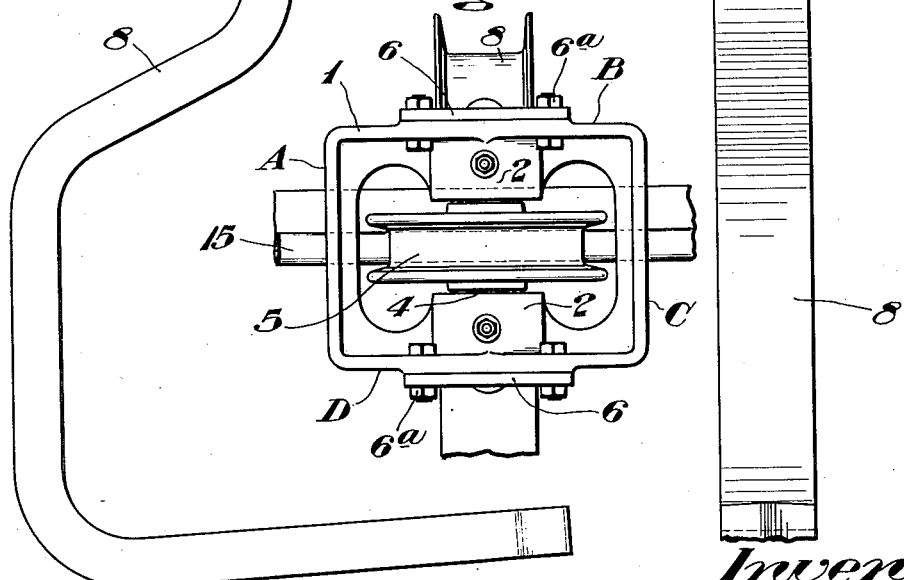
Inventor:
Frank W. Lorig,
by Usina & Rauber
his Attorneys.

Patented Oct. 15, 1935

2,017,404

UNITED STATES PATENT OFFICE 2,017,404

CONVEYER TROLLEY

Frank W. Lorig, Lakewood, Ohio

Application December 8, 1933, Serial No. 701,555

2 Claims. (Cl. 104—93)

This invention relates to conveyers, and more particularly to endless trolley conveyers used in handling coils or coiled bundles of wire rods, wire and like annular articles, and has for one of its objects the provision of a novel trolley structure durable of construction and cheap and easy to manufacture.

Another object is the provision of a novel construction which protects the trolley wheel from injury.

A further object of the invention is to provide a construction which will prevent the fouling or derangement of the trolley wheel on the conveyer track by coming in contact with another trolley or any other object which it might encounter in its movement.

Referring to the drawing:

Figure 1 is an end elevation partly in section of my improved conveyer.

Figure 2 is a side elevation thereof.

Figure 3 is a top plan view.

In the drawing, the numeral 1 indicates the trolley frame or body portion of the conveyer trolley. This trolley frame 1 is a continuous yoke, as shown by A, B, C and D, and has a hanging member 1ª formed integral therewith for supporting the load to be conveyed. The trolley frame 1 may readily be stamped or otherwise cheaply manufactured from suitable material or, if preferred, it may be cast.

On two sides, B and D of the continuous yoke 1, there are shown two enlarged portions 2 forming journal boxes. These may be and preferably are formed integral with the continuous yoke, but if desired they may be entirely separate elements. However, these journal boxes 2 are provided with radial bearings 3, which are shown as being of the roller bearing type. A shaft 4 is journaled in these radial bearings 3 and has a trolley wheel 5 affixed thereto, as by keying or press-fit. The openings 2ª in the ends of the journal boxes 2 are provided with cover plates 6 having thrust bearings 7 associated therewith and are shown in the preferred embodiment in the drawing as constituting a single ball fitting within a recess in each of the plates.

Nuts and bolts 6ª rigidly hold cover plates 6 against the outside of the continuous yoke 1. This will maintain thrust bearings 7 in abutment with the ends of the shaft 4. All of the bearings may be properly lubricated by grease cups associated with the journal boxes 2, as shown.

Hanging member 1ª, which as before mentioned is integral with continuous yoke 1, is provided at its lowest extremity with a clevis portion 9. A conveyer hook 8 is pivotally mounted to the clevis portion 9 of the hanging member 1ª by means of the clevis pin 9ª. This hook is shown as having its extending and elongated hook portion in a plane transverse to that of the movement of the trolley.

The hanging member 1ª is further provided with a cable receiving recess 13, which cooperates with a similar recess 13ª in a cable clamping block 10. A cable 12 is rigidly held in these recesses by nuts and bolts 14, and is positioned immediately below a track 15 along which the trolley wheel 5 is adapted to travel.

In practice, the track 15 is arranged in a continuous overhead position with relation to various work stations between which it is desired to convey bundles of coiled wire rod or other annular objects. A plurality of trolley conveyers while supported on the overhead track is made to travel between these work stations by means of the cable 12, which is power driven by sheaves or other suitable means.

While I have shown and described one specific embodiment of my invention it will be understood that I do not wish to be limited thereto, since various modifications may be made without departing from the scope of my invention, as defined in the following claims.

I claim:

1. In a conveyer trolley, a trolley frame comprising a continuous yoke having a recess in each of its outer sides, a cover plate for each of said recesses, thrust bearings associated with said cover plates, radial bearings within said recesses, a shaft journaled in said radial bearings and abutting said thrust bearings in said cover plate, a trolley wheel affixed to said shaft, a hanging member integral with said yoke, cable clamping means associated with said hanging member, and a conveyer hook pivotally mounted on said hanging member.

2. In a rod coil hook conveyer, the combination of a continuous yoke, a radial and thrust bearing on opposite sides of and enclosed by said yoke, a shaft journaled at each end in said bearings, a wheel affixed to said shaft, a hanging member formed integral with said yoke, a cable receiving recess in said hanging member, a clamp for holding a cable in said recess, a clevis formed integral with said hanging member, a pin for said clevis and a conveyer hook pivotally mounted on said pin.

FRANK W. LORIG.